2,881,215

NITRIC ACID OXIDATION OF CYCLIC ALCOHOLS

Henry C. Godt, Jr., St. Louis, Mo., assignor to Monsanto Chemical Company, St. Louis, Mo., a corporation of Delaware No Drawing. Application April 20, 1955
Serial No. 502,731

3 Claims. (Cl. 260—534)

This invention relates to the oxidation of cyclic alcohols and more specifically pertains to the reaction of cyclic alcohols with nitric acid with the production of new and useful organic chemical compounds.

Heretofore, the oxidation of cyclic alcohols with nitric acid has produced dicarboxylic acids when the oxidation process is carried out at temperatures above about 35° C. Although the present invention relates to the oxidation of cyclic alcohols (cycloalkanols) with nitric acid, the process of this invention does not involve the formation of dicarboxylic acids but rather the process of this invention involves the formation of different chemical compounds.

It has now been discovered that cycloalkanols when oxidized with nitric acid at a temperature below about 35° C. produce a nitrolic acid and when oxidized at a temperature below about 20° C but not lower than about 10° C. produce an appreciable quantity of an epoxy dioxindiol in addition to the nitrolic acid.

The above two classes of chemical compounds obtainable from the process of this invention are exceedingly useful compounds. One use of these compounds is as intermediates in the preparation of dicarboxylic acid. However, the compounds resulting from the process of this invention also can be employed as intermediates for the preparation of other new and useful organic chemical compounds. For example, the mononitrolic acid can be reduced to an amidoxime. The amidoxime reacts with nitrous acid to form an amic carboxylic acid which has, of course, both a carboxylic acid group and a carbamyl group. The epoxy dioxin-diol compounds upon hydrolysis in either an acidic medium or an alkaline medium yields a 1,2-cycloalkanedione or upon reacting with a hydrazine in the presence of a dilute weak acid results in the formation of 1,2-cycloalkanedione osazone. The synthesis of the above compounds from the above two products of the process of this invention are more fully described in co-pending applications, Ser. Nos. 502,730, 502,732, now abandoned, and 502,734, all filed April 20, 1955.

The process of this invention can be carried out by employing as a reactant with nitric acid a cycloalkanol, that is, a cyclic organic compound containing a carbinol group in a non-aromatic ring such as cyclobutanol, cyclohexanol, 3-methylcyclohexanol, cyclopentanol, 3-methylcyclopentanol, gem.-dimethylcyclohexanol, butylcyclohexanol, gem. - dimethylcyclopentanol-3, 3,5-dimethylcyclohexanol, cycloheptanol and 3-nitrocyclohexanol among others.

The following specific examples illustrate the process of this invention and the novel products obtainable therefrom. In these examples the term "parts" is employed to indicate parts by weight.

Example I

To a suitable reaction vessel there is added 70.5 parts of an aqueous solution of nitric acid containing 70% HNO$_3$ by weight. The nitric acid is stirred and cooled to about 20° C. and there is slowly added thereto 25 parts of cyclohexanol while stirring and maintaining the resulting mixture at 20° C. After all the cyclohexanol had been added, the reaction mixture is maintained at 20° C. and stirred for about 15 minutes whereupon a yellow solid precipitated. The resulting aqueous slurry is filtered to recover the yellow solid which is air dried. There is recovered about 30 parts of the yellow solid identified as 6-nitro-6-hydroxyimino-hexanoic acid (adipomononitrolic acid) and having the formula

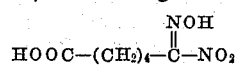

and having a melting point of 77–78° C. with decomposition.

Example II

The process of Example I was repeated except 50 parts (0.5 mole) cyclohexanol was added to 282 parts (3.0 moles) of 67% nitric acid at 20° C. A 60 gram or 63% yield of the dry yellow solid, adipomononitrolic acid, is recovered.

Example III

The process of Example I is repeated except that in this case the reaction temperature is maintained at 15° C. The solid material formed during the process is recovered by filtration, dried and dissolved in methanol. The methanol solution is filtered and a white solid insoluble in methanol is recovered.

The methanol from the solution obtained above is recovered by evaporation leaving a light yellow solid, adipomononitrolic acid.

The recovered white solid identified as octahydro-5aH,-10aH-4a, 9a-epoxy-dibenzo-p-dioxin-5a, 10a-diol having the formula,

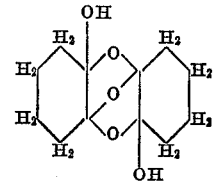

having the odor of burnt sugar and melting at 143° to 144° C. with decomposition.

Example IV

The process of Example I is repeated except 96 parts by weight of an aqueous solution containing 50% by weight HNO$_3$ was employed instead of the more concentrated nitric acid. The products obtained by this process are identical with those obtained in the process described in Example III, however, the yield of octahydro-5aH,-10aH - 4a, 9a-epoxy-dibenzo-p-dioxin-5a, 10a - diol was double that obtained by the process of Example II.

Example V

Succinomononitrolic acid is prepared by repeating the process of Example I employing 18 parts of cyclobutanol in place of cyclohexanol.

Other mononitrolic acids and epoxy dibenzo diol products can be prepared by employing in the processes described in the above examples other of the cycloalkanols hereinbefore defined. For example, 4-butyl cyclohexanol when employed in the process of this invention will produce a butyl substituted adipomononitrolic acid. Other similar variations and embodiments of the process and products within the spirit of this invention will be apparent to those skilled in the art. Thus, it is to be understood that the foregoing specific examples are only illustrative of the invention and are not a limitation thereon.

As illustrated in Examples I and II, the ratio of cycloalkanol to nitric acid can be varied widely from 3 to 6 or more moles of nitric acid for each mole of the cycloalkanol. Also as illustrated in the foregoing examples, the concentration of the nitric acid employed can be varied and for the purposes of this invention nitric acid from about 25% $HNO_3$ to 70% and above $HNO_3$ can be employed.

In combining the reactants, it is preferred to add the cycloalkanol slowly to the cooled nitric acid at a temperature of from about 10° C to below about 35° C. This, of course, includes both the addition of the cycloalkanol to all of the nitric acid in a batch process and combining proportionate parts of each of the reactants continuously. In a batch process adding the nitric acid to the cycloalkanol is less desirable because this means of combining the reactants tends to favor the formation of additional organic acids.

What is claimed is:

1. A nitrolic acid having the formula, $$HOOC-(CH_2)_n-\underset{\underset{NOH}{\|}}{C}-NO_2$$

wherein $n$ is an integer of from 2 to 10.

2. Adipomononitrolic acid having the formula, $$HOOC-(CH_2)_4-\underset{\underset{NOH}{\|}}{C}-NO_2$$

3. Succinomononitrolic acid having the formula, $$HOOC-(CH_2)_2-\underset{\underset{NOH}{\|}}{C}-NO_2$$

References Cited in the file of this patent

UNITED STATES PATENTS 2,719,172    Nebe et al. _____ Sept. 27, 1955

FOREIGN PATENTS 120,518    Switzerland _____ June 1, 1927

OTHER REFERENCES

Meyer: Berichte, vol. 7, pp. 425–434, 1874.
Rodd: Chemistry of Organic Compounds, vol. IA (1951), pp. 372–3.
Treibs et al.: Berichte, vol 87 (1954), page 342.